United States Patent [19]

Schiefer et al.

[11] E Patent Number: Re. 33,036

[45] Reissued Date of Patent: Aug. 29, 1989

[54] CLOSURE MECHANISM WITH GAS SEAL

[75] Inventors: Bernhard Schiefer, Cincinnati, Ohio; Herbert Bumberger, Linz, Austria

[73] Assignees: Didier-Werke AG, Wiesbaden, Fed. Rep. of Germany; Voest-Alpine AG, Linz, Austria

[21] Appl. No.: 125,605

[22] Filed: Nov. 25, 1987

Related U.S. Patent Documents

Reissue of:

[64] Patent No.: 4,555,050
Issued: Nov. 26, 1985
Appl. No.: 512,127
Filed: Jul. 8, 1983

[30] Foreign Application Priority Data

Jul. 12, 1982 [DE] Fed. Rep. of Germany ..... 3226047

[51] Int. Cl.[4] ..... B22D 41/08

[52] U.S. Cl. ..... 222/597; 164/437; 222/606; 295/332

[58] Field of Search ..... 222/591, 600, 603, 597, 222/602, 544, 566, 606; 164/337, 437; 285/332, 332.2, 41; 266/236

[56] References Cited

U.S. PATENT DOCUMENTS

| | | | |
|---|---|---|---|
| 3,502,134 | 3/1970 | Orehos | 164/475 |
| 3,651,825 | 3/1972 | Sury | 222/603 |
| 4,290,589 | 9/1981 | Lührsen et al. | 164/437 |
| 4,429,816 | 2/1984 | Thrower | 222/603 |
| 4,456,157 | 6/1984 | de Jong | 222/591 |

FOREIGN PATENT DOCUMENTS

| | | |
|---|---|---|
| 0048641 | 3/1982 | European Pat. Off. . |
| 2733665 | 2/1979 | Fed. Rep. of Germany . |
| 1474632 | 3/1967 | France . |
| Wo82/01836 | 6/1982 | PCT Int'l Appl. . |

*Primary Examiner*—Robert McDowell
*Attorney, Agent, or Firm*—Wenderoth, Lind & Ponack

[57] ABSTRACT

A closure mechanism includes a conical discharge nozzle and a shielding tube fitted over the exterior of the discharge nozzle. A snug conical joint is formed by closely complementary conical surfaces of the discharge nozzle and the shielding tube. At least one ring-shaped seal is provided in such joint to prevent exterior air from entering between the discharge nozzle and the shielding tube into the interior of the shielding tube. The ring-shaped seal comprises an annular recess formed in one of the conical surfaces, thereby defining an annular chamber, and an inert gas filling such chamber.

8 Claims, 1 Drawing Sheet

CLOSURE MECHANISM WITH GAS SEAL

Matter enclosed in heavy brackets [ ] appears in the original patent but forms no part of this reissue specification; matter printed in italics indicates the additions made by reissue.

BACKGROUND OF THE INVENTION

The present invention relates to a closure mechanism of the type operable alternately for discharging molten metal from a molten metal containing vessel and for blocking such discharge, the closure mechanism being of the type including a conical discharge nozzle and a shielding tube fitted over a portion of the exterior of the discharge nozzle.

In molten metal containing vessels, such as casting ladles and tundishes, a molten metal, for example a steel melt, may be discharged through a closure mechanism, for example a stopper lock or a sliding gate closure unit, into an intermediate vessel or to a continuous casting mold assembly. Closure mechanisms of this type include a lower discharge nozzle, for example attached to a sliding plate of a sliding plate closure unit. To this discharge nozzle is attached a protective tube or shielding tube for the purpose, inter alia, of preventing the environmental atmosphere from oxidizing the discharged molten metal. Conventionally there is provided a conical snug fit or joint between the discharge nozzle and the shielding tube to ensure a reliable seal and to prevent the entrance of surrounding air. Nevertheless, unavoidably some air enters into the interior of the shielding tube along such conical joint. The result is that some of the molten metal passing through the shielding tube becomes oxidized, thereby deteriorating the degree of purity of the molten metal, for example steel.

In the past, various proposals have been advanced to attempt to overcome this problem. Thus, it has been attempted to place gas permeable inserts in the shielding tube beneath the discharge nozzle and to supply a shielding gas, such as an inert gas, to such insert. French Pat. No. 1,474,632 discloses a device in which a snug fit between the discharge nozzle and the protective tube is not required, and rather wherein an open boundary zone therebetween is filled with a protective or shielding gas. This solution however is complex structurally and requires a considerable consumption of the protective gas.

SUMMARY OF THE INVENTION

With the above discussion in mind, it is the object of the present invention to provide a closure mechanism structure of the type discussed above, but which is of a structure which prevents, with a high degree of accuracy, exterior air from entering into the interior of the shielding tube.

This object is achieved in accordance with the present invention by the provision of a snug conical joint formed by closely complimentary conical surfaces of the discharge nozzle and the shielding tube. At least one ring-shaped seal is provided in this joint. In accordance with a preferred arrangement of the present invention, this ring-shaped seal comprises an annular recess formed in at least one of the conical surfaces of the discharge nozzle and the shielding tube. Such recess defines an annular chamber which is filled with an inert gas. Preferably, the recess is formed in the shielding tube. The recess may be formed to be of a uniform depth, or alternatively the recess may be wedge-shaped. An inert gas connection opening may extend through the shielding tube and open into the annular chamber. Such connection opening may be connected to a supply source of the inert gas.

In accordance with a further embodiment of the present invention, an additional ring-shaped seal of refractory fibrous material may be positioned between the discharge nozzle and the shielding tube. Specifically, the shielding tube may have therethrough a discharge passage defining with the conical surface of the shielding tube a step, and the ring-shaped seal formed of refractory fibrous material may be positioned between the step and the outer end of the discharge nozzle. The discharge passage through the shielding tube may be an inner cylindrical surface of the shielding tube.

In accordance with the present invention, air is prevented from passing through the conical joint between the discharge nozzle and the shielding tube by the provision of the annular, inert gas seal. Particularly, after repeated uses of the shielding tube, such that the conical surfaces no longer are closely complementary, the annular seal of inert gas still prevents exterior air from passing between the conical surfaces. In accordance with the present invention, relatively little inert gas is consumed, since the shielding or protective gas flows only along actual leaks between the conical surfaces into the interior of the shielding tube. As long as these areas of leakage between the conical surfaces are leakproof, only a slight amount of inert gas will be consumed.

The annular chamber is of a simple construction, since only a single annular recess need be formed. Such recess may be formed in the outer conical surface of the discharge tube or in the inner conical surface of the shielding tube. However, advantageously the connection opening to the inert gas supply line always should be provided in the body of the shielding tube.

In the embodiment of the present invention employing a refractory fibrous ring-shaped seal between the outer end of the discharge nozzle and a step in the shielding tube, there are provided a number of advantages. Thus, there is provided an increased resistance to the entry therethrough to the interior of the shielding tube. Additionally, this arrangement prevents the buildup of solidified metal, thereby making it possible to use the shielding repeatedly without the necessity of burning out solidified metal. Burning out of solidified metal would chance damage to the annular recess formed in the conical surface of the shielding tube.

BRIEF DESCRIPTION OF THE DRAWINGS

Other objects, features and advantages of the present invention will be described in further detail below, with reference to the accompanying drawings, wherein.

DETAILED DESCRIPTION OF THE INVENTION

Figure 1:
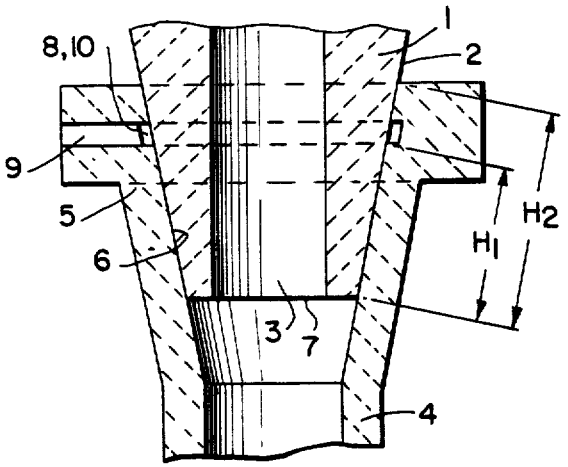
FIG. 1 is a cross-sectional view of the lower portion of a discharge nozzle and the upper portion of a shielding tube in accordance with one embodiment of the present invention.

With reference to FIG. 1, there is shown the lower portion of a discharge nozzle 1 employable in a closure mechanism of the type operable alternately for discharging molten from a molten metal containing vessel and for blocking such discharge. The further structure of the closure mechanism is not shown, and it is intended that the present invention be employable with any known and conventional such closure mechanism structure. Discharge nozzle 1 has therethrough a discharge opening 3, and discharge nozzle 1 has, at least on the lower portion thereof, an exterior conical surface 2. A protective or shielding tube 4 has an upper portion 5 having an inner conical surface 6 joining a lower discharge passage which conventionally is cylindrical. The conical surfaces 2 and 6 are closely complementary to define a tight or snug conical joint between elements 1 and 4. The lower end of shielding tube 4 is not illustrated, but is intended to extend into an intermediate vessel or a continuous casting mold, as is known in the art.

At least one ring-shaped seal is provided in the joint between conical surfaces 2, 6. Specifically, such ring-shaped seal is defined by an annular chamber 8 formed by an annular recess formed in at least one of the conical surfaces 2, 6. In the arrangement illustrated, the recess is formed in the conical surface 6 of shielding tube 4, and such recess is a ring-shaped recess 10 of uniform depth. An inert gas connection opening 9 passes through upper portion 5 of shielding tube 4. Opening 9 is adapted to be connected to an inert gas supply line and opens into annular chamber 8. Accordingly, annular chamber 8 is filled continually with inert gas.

The apparatus of FIG. 1 operates in the following manner. Thus, when molten metal passes through outlet opening 3 and enters the interior of shielding tube 4, a reduced pressure condition is created because of the cross-sectional expansion of the interior of shielding tube 4 with respect to the lower end 7 of discharge nozzle 1. This has the tendency to cause external environmental air to be drawn inwardly along the conical joint, i.e. generally downwardly as shown in FIG. 1. However, the ring-shaped seal formed by the inert gas filled annular chamber 8 prevents air from being drawn inwardly. This protects the metal discharge passing through shielding tube 4 from oxidation.

If the joint between the conical surfaces 2, 6 is not entirely leakproof, which especially can happen after repeated uses of the shielding tube 4, the shielding or protective inert gas supplied from opening 9 and into chamber 8 will be caused to flow inwardly only between those areas of the conical surfaces actually having leaks. By increasing the supply pressure of the inert gas, an effective purging of inert gas, for example argon, can be achieved through the shielding tube 4 into the intermediate vessel to eliminate non-metal inclusions.

FIG. 1 shows relative dimensions of the location of the ring-shaped seal. Thus, $H_2$ indicates the total length of the joint, i.e. the total length through which exterior environmental air would have to pass to reach the interior of shielding tube 4. $H_1$ indicates that a substantial portion of the length $H_2$ is protected by the inert gas in annular chamber 8.

Figure 2:
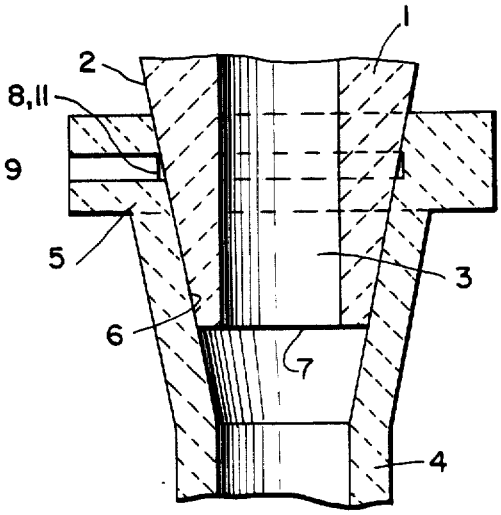
FIG. 2 is a view similar to FIG. 1, but of a second embodiment of the present invention.

The embodiment of FIG. 2 is similar to the embodiment of FIG. 1, with the exception that the chamber 8 is defined by a wedge-shaped recess 11 formed in the inner conical surface 6 of the shielding tube 4. Recess 11 is somewhat easier to form that recess 10. Otherwise, the embodiment of FIG. 2 operates in the same manner, as the embodiment of FIG. 1.

Figure 3:
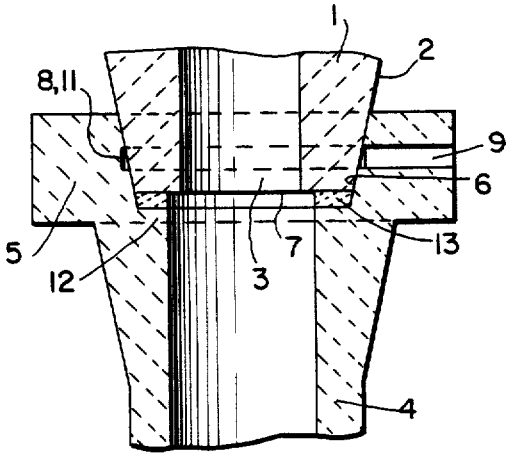
FIG. 3 is a view similar to FIGS. 1 and 2, but of a third embodiment of the present invention.

It also is possible in accordance with the present invention to provide an additional ring-shaped seal of a refractory fibrous material positioned between the discharge nozzle and the shielding tube. Such an arrangement is shown in the embodiment of FIG. 3. Thus, shielding tube 4 has formed in the interior thereof a step 12 defined between conical surface 6 and the discharge passage of the shielding tube. A ring-shaped seal 13 formed from a compressable ceramic refractory fibrous material is positioned on step 12, and the outer end 7 of discharge nozzle 1 rests on seal 13. Those of ordinary skill in the art will understand the type of materials which may be employed to form seal 13. The embodiment of FIG. 3 operates substantially in the same manner as the embodiment of FIG. 1. Seal 13 improves sealing between the discharge nozzle and the shielding tube, i.e. between annular chamber 8 and the interior of the shielding tube. If the shielding tube is used repeatedly, a new seal 13 can be inserted after each use. FIG. 3 shows the diameter of the discharge passage through shielding tube 4 being smaller than that of outlet opening of discharge nozzle 1. However, such diameters may be the same, since they are both cylindrical. Thereby, during the discharge of molten metal, the reduction in pressure will be less, such that the sealing requirements will be less stringent, as there will be less of a tendency for exterior air to be drawn into the interior of the shielding tube.

In the devices of the present invention, it is possible to achieve reliable sealing without the provision of gas permeable inserts in the annular chamber 8.

The present invention has been described and illustrated with regard to particularly preferred embodiments thereof. However, it is to be understood that various changes and modifications may be made to the specifically described and illustrated structure without departing from the scope of the present invention.

We claim:

1. In a closure mechanism of the type operable alternately for discharging molten metal from a molten metal containing vessel and for blocking such discharge, said closure mechanism being of the type including a conical discharge nozzle and a shielding tube fitted over the exterior of said discharge nozzle, the improvement of means for preventing exterior air from entering between said discharge nozzle and said shielding tube into the interior of said shielding tube, said preventing means comprising:

a conical joint formed by conical surfaces of said discharge nozzle and said shielding tube, said conical surfaces of said discharge nozzle and said shielding tube being closely complementary [and in abutment] *without an open space therebetween*, thereby forming a snug said conical joint; and at least one ring-shaped seal in said joint, said ring-shaped seal comprising an annular recess formed in one of said concial surfaces, thereby defining an annular chamber, and an inert gas filling said chamber.

2. The improvement claimed in claim 1, wherein said recess is formed in said shielding tube.

3. The improvement claimed in claim 1, wherein said recess is formed in said one conical surface to a uniform depth.

4. The improvement claimed in claim 1, wherein said recess is wedge-shaped.

5. The improvement claimed in claim 1, further comprising an inert gas connection opening extending through said shielding tube and opening into said chamber.

6. The improvement claimed in claim 1, further comprising a second ring-shaped seal of refractory fibrous material positioned between said discharge nozzle and said shielding tube.

7. The improvement claimed in claim 6, wherein said shielding tube has therethrough a discharge passage defining with said conical surface tube a step, and said second ring-shaped seal is positioned between said step and the outer end of said discharge nozzle.

8. The improvement claimed in claim 7, wherein said discharge passage is defined by an inner cylindrical surface of said shielding tube.

* * * * *